(No Model.)
A. J. CHASE.
REFRIGERATING APPARATUS.
No. 433,272. Patented July 29, 1890.
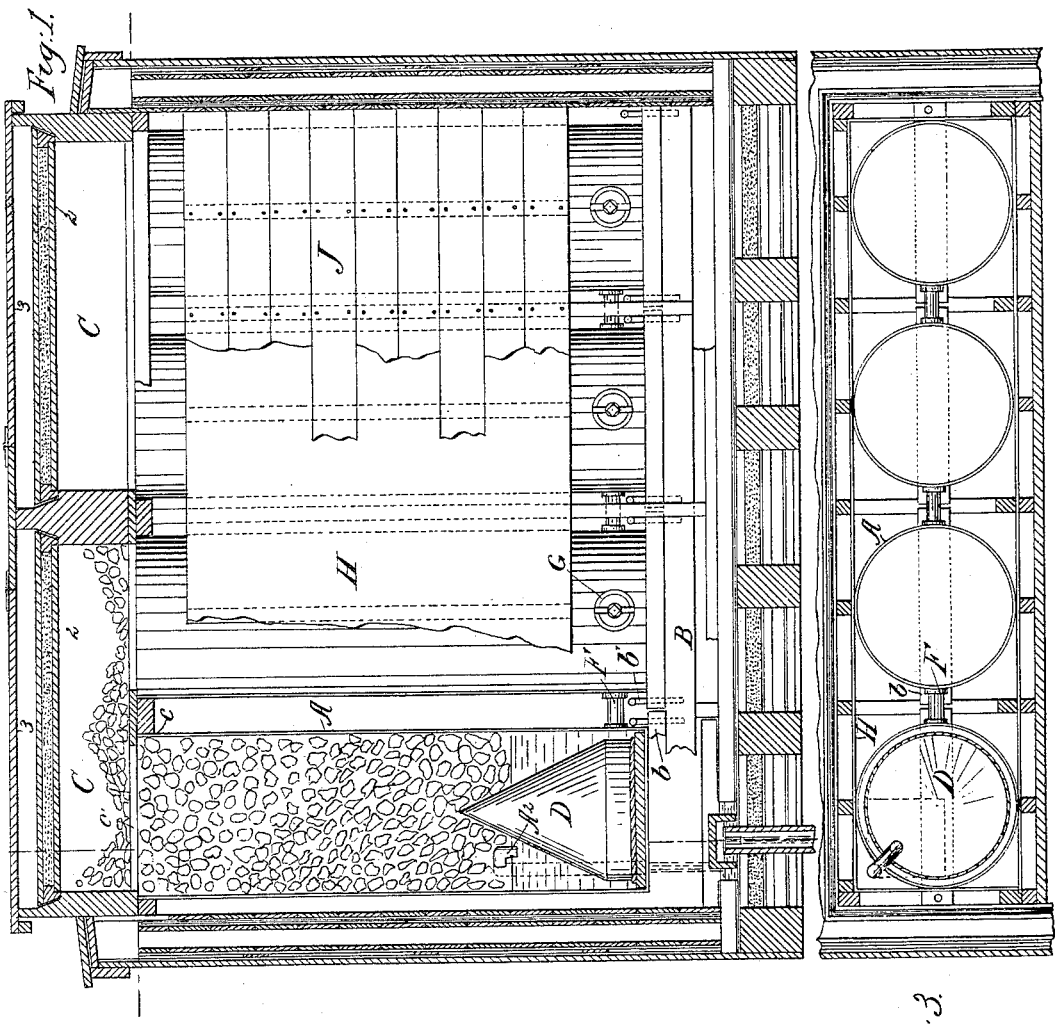
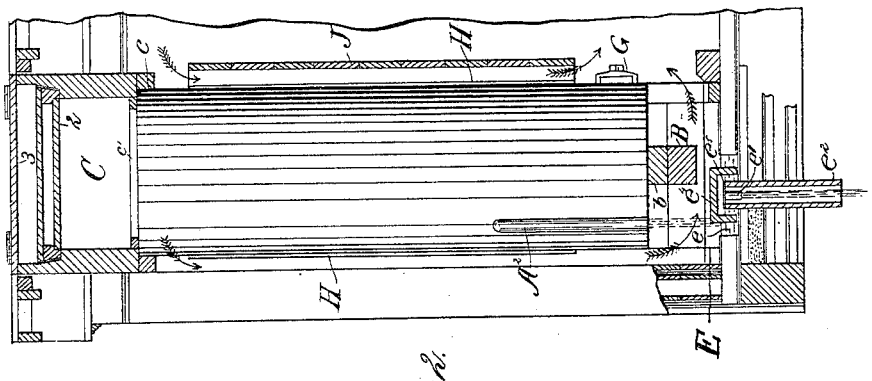
Witnesses:
Fred. S. Greenleaf
Edgar A. Golden
Inventor:
Andrew J. Chase
by Crosby & Gregory
Attys.

UNITED STATES PATENT OFFICE.

ANDREW J. CHASE, OF BOSTON, MASSACHUSETTS, ASSIGNOR TO THE KANSAS CITY PACKING AND CHASE REFRIGERATING COMPANY, OF MAINE.

REFRIGERATING APPARATUS.

SPECIFICATION forming part of Letters Patent No. 433,272, dated July 29, 1890.

Application filed May 23, 1890. Serial No. 352,821. (No model.)

*To all whom it may concern:*

Be it known that I, ANDREW J. CHASE, a citizen of the United States, residing in Boston, in the county of Suffolk and State of Massachusetts, have invented an Improvement in Refrigerating Apparatus, of which the following description, in connection with the accompanying drawings, is a specification, like letters on the drawings representing like parts.

In Letters Patent No. 374,114, granted to me November 29, 1887, for improvement in refrigerating apparatus, I have shown and described a series of ice-tanks having connected therewith and arranged below a series of pickle tanks or chambers with a perforated partition separating the pickle tanks or chambers from the ice-tanks, and also a metallic casing surrounding the series of ice-tanks and in touch therewith to increase the refrigerating-surfaces, the metallic case being open at top and bottom to permit free circulation of air over and under it, so as to come in contact not alone with the ice-tanks but also with the inner and outer wall or surface of such surrounding metallic case. In this class of refrigerating apparatus, more especially adapted to refrigerating-cars for the shipment of perishable goods over long distances, it is, as known, necessary that the goods be kept in an inclosed chamber at a low temperature near the freezing-point of water, and that, further, to get the best results the inclosed air must be anhydrous or exceedingly dry and in constant motion or automatic circulation.

To attain more perfectly these results is the object of my present invention. To this end I employ one or more imperforate tanks to contain crushed ice or a freezing-mixture of crushed ice and salt, each tank being provided at its bottom with a tapering or cone-shaped projection whose base rests on the bottom of the tank and which extends upward in the interior of said tank, so that its apex will project above the liquefied freezing-mixture, the height or column of which latter will be regulated or determined by a trapped overflow or discharge pipe communicating with the interior of the tank. Further, I provide a series of imperforate tanks coupled together, but provided with an overflow-pipe, to maintain the liquid-line of the pickle or liquefied freezing-mixture at a given level, and having means to permit the tank to receive refrigerating material and surround the series of tanks with a metallic casing open at top and bottom to permit air to circulate above and below the casing, the said casing being in contact tangentially with the walls of the series of ice-tanks above and below the liquid-line of pickle or liquefied freezing-mixture, whereby the metallic casing will serve as a very effective refrigerating-surface, receiving in the main its refrigerating properties through conduction from the liquefied freezing-mixture. Further, each tank is supported upon a removable bolster-block with its upper end disposed in a circular opening or rabbet in the frame, forming, in this instance, the bottom of the ice-supply trunk or hopper extending across the roof of the car, the bolster-block being readily removable to allow the tank to descend, so that its upper end will be freed from the rabbet or groove referred to, in order that the tank may be readily removed for repairs or for other purposes. As in the patent referred to, a drip-pan is provided to receive and collect the moisture that may drip from the metallic casing and the ice tank or tanks. In the present instance, however, I provide the drip-pan with a trap of peculiar construction on the interior of the car and a discharge-pipe incased in a second pipe leading therefrom and passing through the bottom of the said car, whereby the waters of condensation and waste pickle overflowing the trap will be discharged from the car and all fear of damage to the trap by freezing, as is often the case in severe climates where the trap is located exteriorly of the car, is avoided.

The invention is more fully described in the following specification, and pointed out in the claims.

Figure 1 shows in transverse vertical section a car-body illustrating, partly in section and partly in front elevation, a series of ice-tanks with their adjuncts embodying my invention. Fig. 2 shows an end elevation of one of the ice-tanks and, in section, part of the car-body, the hopper or trough, the drip-pan and trap, and other minor features. Fig. 3 is a top view of the tanks, showing more clearly the surrounding metallic case or jacket.

The tanks A are supported upon the blocks $b$, detachably secured to the bolster B by the pins $b'$, suitably secured to the bottom of the car. The upper ends of the tanks are arranged in the rabbet $c$ in the frame, which, in this instance, forms the bottom of the trunk or hopper C, which is provided with openings communicating with the interior of the tank, as shown at $c'$ in Fig. 1. By this construction the tanks are firmly held in position at their upper ends from lateral play by means of the rabbet, and yet when it is desired to remove for repairs or otherwise the ice-tank A it may be done by removing the blocks $b$ from beneath the ice-tank and allowing it to descend and rest on the bolster, when the upper end of the tank will have been freed from the rabbet or groove.

Resting on the bottom of each tank A on its interior is a tapering projection or cone D, whose apex is, as shown, extended a distance above the line or level of the pickle, the pickle or liquefied freezing-mixture occupying the space between the walls of the tank and the surface of the cone, as well as within the body of the cone itself, if preferred, the latter resting loosely on the bottom of the tank, which will permit circulation therein of the pickle, while the apex of said cone projects into the center of the mass of superincumbent broken ice to force it, as it settles, outwardly against the walls of the tank and cause it to be in constant contact therewith, thereby increasing the refrigerating capacity of the tank. The trapped overflow or discharge-pipe $A^2$ communicates with the interior of the tank, as shown in Fig. 1, and extends down its exterior, as shown in Fig. 2, to discharge the waste pickle into the drip-pan E, which is arranged below the series of tanks as well as below the jacket or casing H to catch the drippings or waters of condensation therefrom.

As shown in the present instance, a trunk or hopper C is provided for each pair of ice-tanks, the trunk or hopper having a removable door or cover 2 and an outer hinged door or cover 3, by which ice may be supplied to the hopper and tanks, as is usual. In the present instance I provide four ice-tanks coupled together by the pipes or couplings F and provided with one trapped overflow or discharge pipe $A^2$ before referred to, whereby the liquefied freezing-mixture or pickle is maintained at a common level in all the tanks, and each tank is provided with a plug G at or near its bottom to enable the tanks to be cleansed, when desired.

As more clearly shown in Fig. 3, the metal casing or jacket H surrounds the series of tanks, and is in tangential contact with the periphery of said tanks substantially throughout the height of the jacket, so that by conduction the jacket or casing becomes a refrigerating-surface, and air brought in contact with the inner or outer face or side thereof will be cooled and robbed of its moisture, which will drip down the sides of the casing or jacket and into the drip-pan. This jacket or casing, together with the partition J, (more clearly shown in section in Fig. 2 as disposed in relation to the metal casing or jacket,) are fully shown and described in the Letters Patent granted to me above referred to and need no particular description here, except to say, for the purpose of clearness in this connection, that, as shown, the said jacket and partition are of less height than that of the ice-tanks to permit the air to freely circulate above and below said partition and jacket and to pass into the spaces between the ice-tanks and the inclosing-jacket, as well as in the spaces between the partition and front wall of inclosing-jacket and into the spaces between the rear wall of the inclosing-jacket and the end wall of the car, as indicated by the arrows in Fig. 2, to provide for a free circulation and cooling of the air confined in the car, the air of higher temperature in the car passing along the ceiling or top thereof, thence to and through the air-spaces between the jacket and tanks, as well as between the jacket and partition and end wall of the car, where it is cooled, and by reason of its greater density falls and passes from the refrigerating-surfaces of the tanks, as clearly indicated by the arrows, and circulates throughout the car-body, to be again returned and cooled, thus maintaining a dry atmosphere and an automatic circulation of air. In this connection, however, it will be noted, as above pointed out, that in the present instance, and as an important and essential feature of my present invention, the jacket is in contact with the ice-tanks below the level of the pickle or liquefied freezing-mixture, or, in other words, in contact with more or less of that portion of the tank containing the pickle, so that by conduction the refrigerating properties of the pickle are transmitted with the least possible loss to the jacket, which thereby becomes a very effective and greater refrigerating-surface than otherwise.

In the present instance I have shown the drip-pan E as provided with a well $e$, in which the waste pickle and water of condensation collect. In this well I provide a small short discharge-pipe $e'$, having a flange $e^5$ mounted on a wooden or other non-conducting inclosing or surrounding pipe $e^2$, whose interior is not in touch with the exterior of the discharge-pipe, and whose length greatly exceeds the length of said discharge-pipe, the said surrounding pipe $e^2$ passing through the bottom of the car, as shown. A loose cap or cover $e^4$ is placed over the upper ends of the pipes $e'$ and $e^2$ to form a seal or trap, as shown, the waste water passing under the cap, over the upper edge of the pipe $e'$, and into the same, whence it falls through space down through and out of the larger bore of the pipe $e^2$. By this construction the discharge-pipe $e'$ is in effect protected by an inclosed body of air in the pipe $e^2$ from the severe action of frost and the freezing up of the trap is avoided.

I claim—

1. In refrigerating apparatus, an imperforate ice-tank adapted to receive and contain broken ice or a freezing-mixture, substantially as specified, provided at its bottom with a tapering projection or cone arranged entirely within said tank and extending upward therein for a part only of the height of said tank, with its apex below the top of said tank, and arranged to partially penetrate the mass of broken or granulated ice, and as it settles force it laterally against the walls of the tank, being provided with a suitable discharge or overflow for the liquefied freezing-mixture, as and for the purpose set forth.

2. In refrigerating apparatus, an ice-tank combined with a base or bolster and an interposed removable supporting-block upon which rests the ice-tank, and a shed or frame provided with a groove or rabbet to engage the top of the ice-tank, as and for the purpose specified.

3. In refrigerating apparatus, a series of imperforate communicating ice-tanks provided with an overflow or discharge pipe to maintain the liquefied freezing-mixture at a level common to all, each tank provided with a tapering projection or cone, such as D, for the purpose specified, combined with a metallic casing or jacket surrounding the series of tanks and in tangential contact with each tank, substantially as specified, the said jacket or casing being of less height than the tanks to permit air to pass freely over and under said casing and enter and emerge from the spaces between the said casing and tanks, as and for the purposes specified.

4. In refrigerating apparatus, a series of imperforate ice-tanks provided with an overflow or discharge to maintain the liquefied freezing-mixture at a predetermined level and having means to permit ice or other refrigerating material to be supplied thereto, combined with a metallic casing or jacket surrounding the series of tanks and in tangential contact with each tank above and below the liquid line or level of the liquefied freezing-mixture or pickle, the said jacket or casing being of less height than the tanks to permit air to pass freely over and under said casing and enter and emerge from the spaces between said casing and tanks, as and for the purposes specified.

5. The trap for the discharge of waste liquid, consisting, essentially, of a well, a loose cap or cover, a discharge-pipe projecting above the bottom of the well and under the cap, and a pipe, such as $e^2$, surrounding the discharge-pipe, whose bore is in excess of the diameter of the discharge-pipe, and whose length is materially greater than that of said discharge-pipe, substantially as and for the purpose specified.

6. The combination, with an imperforate ice-tank adapted to receive and contain broken ice or a freezing-mixture, and provided with an overflow or discharge arranged to regulate the height or column of the liquefied portion of said freezing-mixture, of a tapering projection or cone located entirely within said tank and extending part way its length, the base of said cone being at the bottom of said tank while its apex is disposed below the top of the tank and above the overflow or discharge thereof, whereby said apex will project above the column of the liquefied portion of the freezing-mixture and partially penetrate the mass of broken ice, substantially as and for the purpose set forth.

In testimony whereof I have signed my name to this specification in the presence of two subscribing witnesses.

ANDREW J. CHASE.

Witnesses:
JAS. H. CHURCHILL,
JAMES H. LANGE.